May 8, 1934. E. E. DAVIDSON 1,958,131
METHOD OF PRODUCING WEATHER STRIPPING
Filed June 5, 1931 2 Sheets-Sheet 1
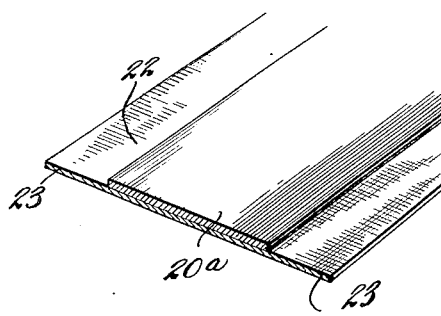
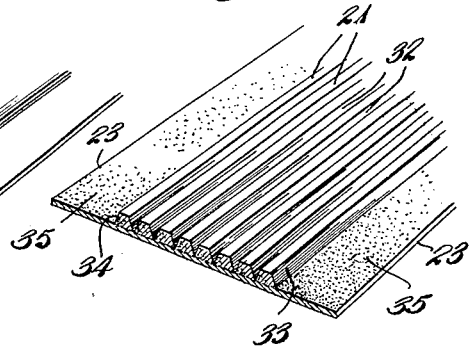
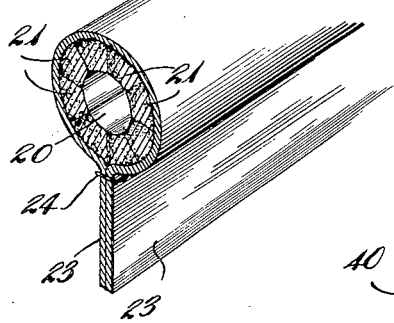
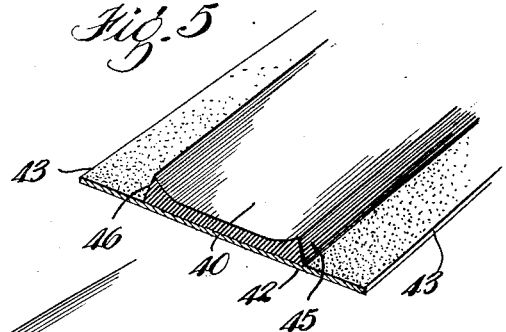
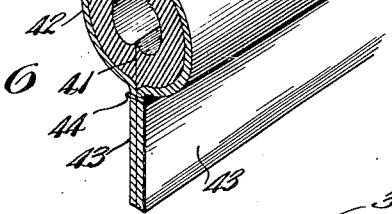
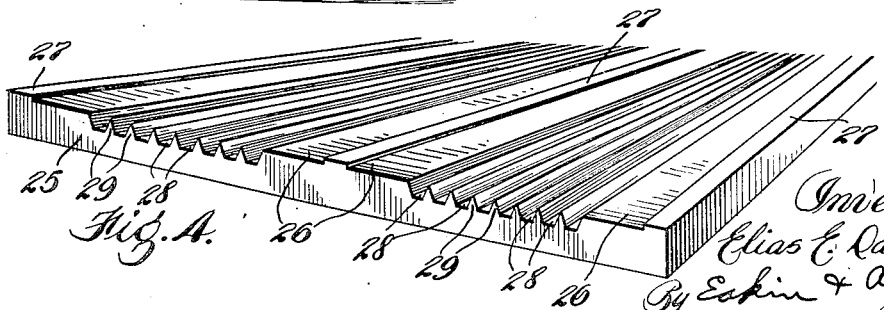

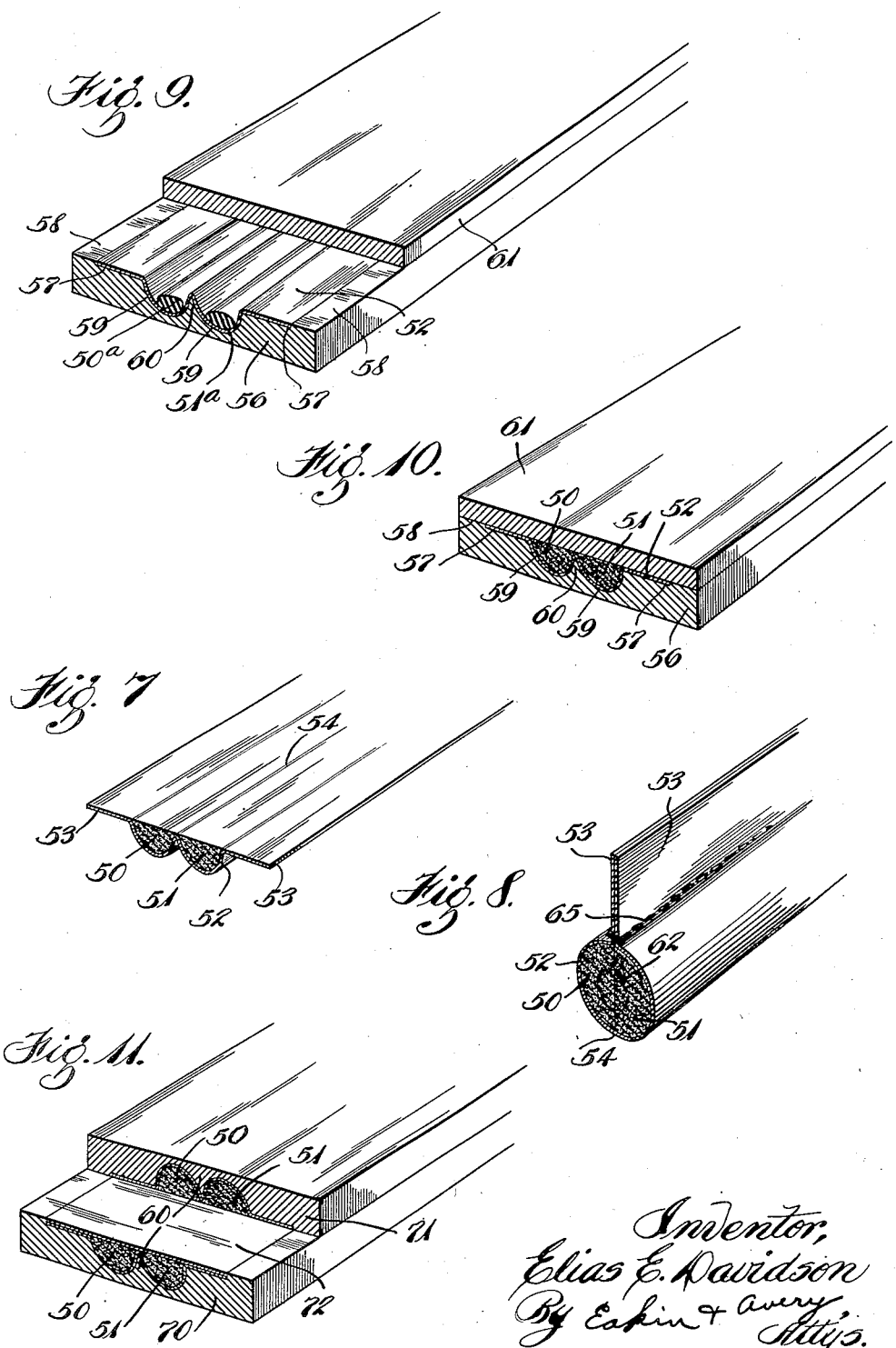

Patented May 8, 1934

1,958,131

UNITED STATES PATENT OFFICE 1,958,131

METHOD OF PRODUCING WEATHER STRIPPING

Elias E. Davidson, Akron, Ohio, assignor to The B. F. Goodrich Company, New York, N. Y., a corporation of New York Application June 5, 1931, Serial No. 542,244

10 Claims. (Cl. 18—59)

This invention relates to stripping of the type generally classifiable as weather striping, including windlace and gasket stripping, and to procedure for making the same.

Objects of the invention are to provide improved stripping and to provide simplified procedure whereby the same may be conveniently and economically made.

More detailed objects are to provide for facilitating the construction of a strip with a body of soft or sponge rubber composition in an enclosing cover and to provide economically for maintaining the assembled structure in the desired shape with the desired resilience, flexibility and durability.

These and other objects will be apparent from the following description, reference being had to the accompanying drawings in which:

Figs. 1, 2 and 3 are perspective views showing a strip body and cover structure in consecutive stages of manufacture according to the invention, Fig. 3 illustrating a completed strip.

Fig. 4 is a perspective view of a mold including the top therefor, for molding the stripping of Figs. 1 to 3.

Figs. 5 and 6 are perspective views of a modified form of strip in consecutive stages of manufacture, Fig. 6 illustrating a complete strip.

Figs. 7 and 8 are perspective views of a further modified form of strip in consecutive stages of manufacture, Fig. 8 illustrating a completed strip.

Fig. 9 is a perspective view, partly broken away, of a mold used in the production of the stripping of Figs. 7 and 8, this view showing strip forming materials in the mold cavity before vulcanization.

Fig. 10 is a perspective view of the mold of Fig. 9 with the strip forming materials after vulcanization.

Fig. 11 is a perspective view, partly broken away, of a modified form of mold showing strip forming materials after vulcanization.

Referring to the embodiment of Figs. 1 to 3, the completed strip, shown in Fig. 3, comprises a hollow cylindrical core structure 20 having a plurality of elements 21, 21 arranged side by side circumferentially of the strip and extending longitudinally thereof, these elements being of a soft rubber composition, preferably spongy, and being adhered to a cover 22, preferably of fabric, which encloses the body 20 and has attaching flaps 23, 23 which are held together by suitable means, such as stitching 24, to hold the body of the strip in its cylindrical shape.

According to the preferred manner of making this strip, the cover 22, in the flat form of Fig. 1, is first provided with a layer 20a of unvulcanized rubber composition containing a blowing agent, this layer being applied to the central portion of one face of the strip, longitudinally thereof, with the marginal portions 23, 23 of the cover exposed to serve in the final product as the attaching flaps.

The composite structure of Fig. 1 is placed in the cavity of a mold, such as that shown at 25 in Fig. 4, and is there subjected to heat, causing the rubber layer 20a, by expansion due to its contained blowing agent, to accommodate itself to the mold cavity and take the form illustrated in Fig. 2.

The mold face is formed with a shallow recess 26 between longitudinally extending shoulders 27, 27, of only sufficient depth to accommodate the flat cover strip 22, and centrally of the recess 26 the mold face is formed with a plurality of longitudinaly extending flat bottomed grooves 28, 28 separated by V-shaped ridges 29, 29. The rubber and fabric structure of Fig. 1 is placed in the mold recess with the rubber facing the grooves and ridges and a flat cover plate 30 is then placed against the shoulders 27, 27 to form a backing for the fabric and rubber in the mold.

Under the heat and internal pressure of molding the rubber 20a is caused to be bonded securely with the fabric and to fill the grooves of the mold to form trapezoidal ridges constituting the elements 21, 21. These ridges of rubber are separated by grooves 32, 32, the side walls of which converge toward and extend either substantially to the fabric, thus causing the ridges to be separated from one another, or extend to points sufficiently close to the fabric so that the rubber at the bottoms of the grooves will not offer excessive stiffness against flexing of the strip along the longitudinally extending lines at the bottoms of the grooves.

The strip of Fig. 2 is then flexed to the shape of Fig. 3, by bringing the lateral margins 23, 23 of the fabric together, to form a tubular cover with the rubber inside, that portion of the strip which includes the body of rubber being caused to flex to the tubular shape. It is preferable that the rubber elements 21, 21, be molded to such shape that when the cover strip is brought to the tubular form these elements will be caused to contact one another over a considerable portion of their side walls for stability of the tube wall, but without considerable pressure being set up circumferentially of the tube by the close association of the segments, such as would tend to exert an excessive strain on the stitching. The outer side walls 33 and 34 (Fig. 2) of the two marginal ridges are caused to abut in the tubular structure and are retained in this relation by the stitching 24 to resist undesirable flattening of the strip from its cylindrical shape. For contributing to the integrity of the completed strip, an adhesive cement may be provided on its contacting surfaces, as indicated at 35 in Fig. 2.

It is preferred that the rubber ridges 21, 21 be of truncated form, which results in the tubular structure shown, but, if desired, the ridges may be molded with apices which may come together at the central zone of the cylindrical body to constitute a fuller bodied and stiffer strip than that of the tubular form.

Referring now to the modification of Figs. 5 and 6, the latter of which shows the completed strip, the core of the strip is composed of but a single element of yieldable rubber composition 40, instead of a plurality of elements as in the first embodiment. The body is an originally flat rubber strip flexed to tubular shape and is held in that shape with its lateral edges abutting at 41 by an enclosing cover 42 having flaps 43, 43 which are secured together by suitable means such as the stitching 44 to maintain the body in the tubular shape. As in the procedure of the first modification, the rubber and cover fabric are preferably assembled as a composite flat strip, as shown in Fig. 5, which is then flexed to the tubular shape of Fig. 6. The rubber 40 is molded to the flat shape of Fig. 5, preferably with the use of a blowing agent, and is preferably vulcanized in adhesion with the cover 42. The lateral edges of rubber are preferably formed with side walls 45 and 46 at the proper degree of slope to be caused to abut at 41 over a considerable portion of their area when the strip is brought to the tubular form. If desired, the rubber may be thickened at its marginal zones, as shown to provide increased abutting area and increased stiffness in this zone of the final strip for resisting distortion from its cylindrical form, and this construction is of course applicable as well to other embodiments where the core is tubular.

In the further modification of Figs. 7 to 11, referring now to Figs. 7 and 8, the rubber elements are in the form of two mating semi-cylindrical strips 50 and 51 which are mounted in side by side relation, in the flat form of Fig. 7, to a cover 52 which is adhered over its central area to the semi-cylindrical surfaces of the rubber strips and has laterally projecting marginal portions 53 adapted to serve as attaching flaps in the final product. If desired, the cylindrical core may be made hollow as indicated by the broken line 62 in Fig. 8.

The structure is brought from the flat form of Fig. 7 to the cylindrical form of Fig. 8 by causing the strip to flex about the longitudinal medial line 54 of the cover, bringing the flat surfaces of the two rubber strips into abutting relation and the cover flaps 53, 53 together, as shown. A suitable securing means, such as stitching 65, is provided for securing the flaps together and holding the strip in the cylindrical shape. If desired, the surfaces of the strip which are brought into contact may be coated with an adhesive cement to contribute to the integrity of the strip.

It will be noted that in this embodiment the stitching 65 is located at a position diametrically opposed to the zone of flexure of the strip halves, at which zone stiffness of the strip is largely localized, and that consequently the stitching is at a position of good mechanical advantage to resist any tendency of the strip to spring open from its closed or cylindrical form, with the consequence of but little strain on the stitching.

In the preferred manner of making the strip of this modification, the rubber strips 50 and 52 are molded and vulcanized to the fabric cover, in a mold such as shown in Figs. 9 and 10, and by the use of a blowing agent in the rubber. The illustrated mold comprises a member 56 formed with a shallow recess 57 in its face between marginal shoulders 58, 58 and of a depth sufficient to accommodate a thickness of cover fabric, and centrally the mold face is formed with a pair of longitudinally extending, semi-circular grooves 59, 59, separated by a ridge 60. A mold cover plate 61 is adapted to lie upon the shoulders 58, 58 of the other mold member to back the material of the strip. The materials are placed in the mold, as shown in Fig. 9, preferably with the fabric 52 flexed to the contour of the cavity wall, and with the rubber composition and its contained blowing agent in the form of strips 50a and 51a each lying in its respective groove. On subjecting the covered mold to the heat of vulcanization the rubber is caused to expand to the form of Fig. 10 in secure adhesion with the cover fabric, and on removal from the mold the composite strip is in the flat form shown in Fig. 7 ready for the operation of flexing it to the form of Fig. 8.

By utilizing a mold constructed as shown in the modification of Fig. 11, in which the upper and lower mold members 70 and 71, respectively, are formed with opposing mold cavities in their faces and a separating plate 72 is provided between the opposing cavities, the number of strips produced in each cure may be doubled.

It will be seen that stripping made according to this invention may be produced economically and efficiently without sacrifice of the desired durability, resilience and flexibility of the product. By molding the stripping progressively along its length, the stripping may be produced in long lengths suitable for reeling and subsequent cutting to shorter lengths without waste, as it is needed.

Variations may be made without departing from the scope of the invention as it is defined in the following claims:

What is claimed is:

1. The method of making weatherstripping which comprises providing on one face of a flexible cover strip resilient rubber composition of such nonfinal shape that it is adapted by relative movement of portions thereof laterally of the strip to be caused to assume a final determinate shape, then, by movement of the lateral margins of the cover strip toward each other, so flexing the cover as to cause such movement of the rubber to its final shape, and securing together the margins of the so flexed cover.

2. The method of making weatherstripping which comprises providing on one face of a flexible cover strip resilient vulcanized rubber composition of such non-cylindrical shape that it is adapted by flexure of the cover strip along its length to be caused to assume a substantially cylindrical shape, then so flexing the cover, and securing the structure against reverse flexure.

3. The method of making weatherstripping which comprises applying to one face of a flexible cover strip an unvulcanized rubber composition, molding the composite structure to such nonfinal shape that it is adapted by relative movement of portions thereof laterally of the strip to be caused to assume a determinate final shape, vulcanizing the composite structure in its molded non-final shape, then so flexing the structure as to cause it to assume its final shape, and securing the structure against reverse flexure.

4. The method of making weatherstripping which comprises providing on one face of a strip of flexible material a body of vulcanized rubber composition, then changing the shape of the rubber body by flexure of the structure along the length of the strip and substantially over the entire width of the rubber, and securing together the marginal portions of the so flexed structure.

5. The method of making weatherstripping which comprises providing centrally on one face of a flexible cover strip a longitudinally extending body of vulcanized rubber composition of less width than the cover strip, then, by flexure of the cover strip along its length to form a core-enclosing tube, changing the shape of the rubber body to form a core of determinate shape, and securing together the marginal portions of the so flexed cover.

6. The method of making weatherstripping which comprises providing side by side on one face of a flexible cover strip a plurality of longitudinally extending elements of vulcanized rubber composition adapted to be moved laterally into association to form the core of the strip, flexing the cover along its length to bring said elements into such association, and securing the cover with the rubber elements held so associated.

7. The method of making weatherstripping which comprises applying unvulcanized rubber composition to one face of a flexible cover strip, molding and vulcanizing the composite structure to form in adhesion with the cover a plurality of rubber elements adapted to be brought into association to form the core of the strip, flexing the cover along its length to bring said elements into such association, and securing the cover with the rubber elements held so associated.

8. The method of making weatherstripping which comprises providing on one face of a flexible cover strip a plurality of longitudinally extending elements of vulcanized rubber composition adapted to be brought into association by flexure of the cover along its length to form a substantially cylindrical core, them so flexing the cover as to enclose the rubber elements and bring them into such association, and securing the cover against reverse flexure.

9. The method of making weatherstripping which comprises applying unvulcanized rubber composition to one face of a flexible cover strip, shaping the composite structure to present along the face of the cover a plurality of longitudinally extending rubber elements of such shape and disposition laterally of the cover strip as to be adapted by flexure of the strip along its length to be associated to form a substantially cylindrical core, then so flexing the strip and securing the same against return flexure.

10. The method as defined in claim 9 in which a blowing agent is incorporated in the rubber and the composite strip is shaped by molding and vulcanizing between mold surfaces.

ELIAS E. DAVIDSON.